H. R. WOODROW.
ELECTRIC WELDING MACHINE.
APPLICATION FILED OCT. 23, 1916.
1,212,869.  Patented Jan. 16, 1917.
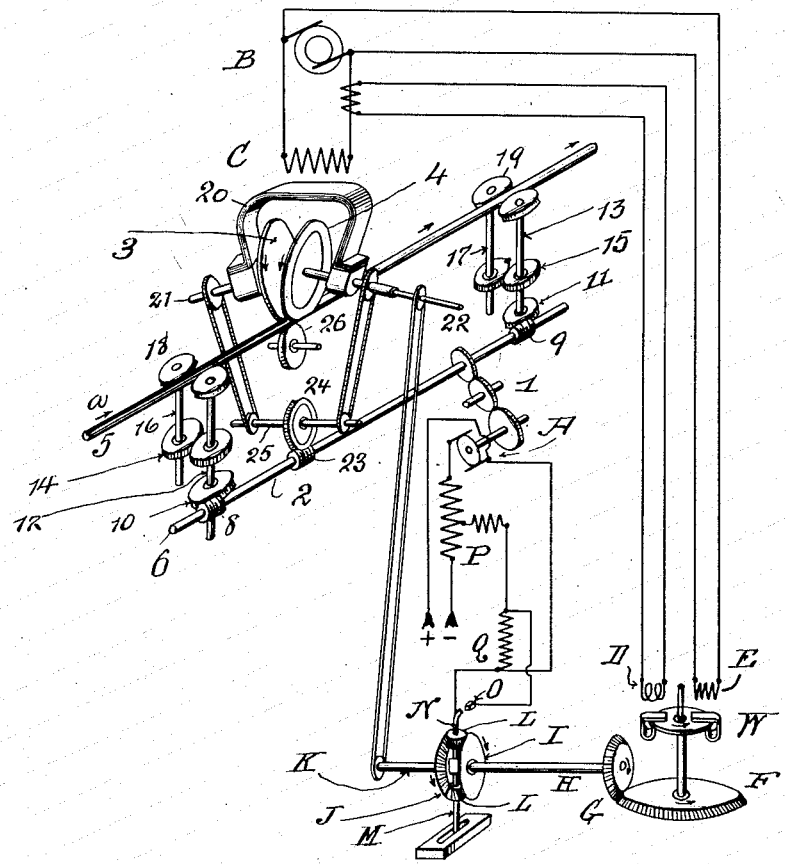
INVENTOR
Harry R. Woodrow
BY Park Benjamin
his ATTORNEY

UNITED STATES PATENT OFFICE.

HARRY R. WOODROW, OF NEW YORK, N. Y., ASSIGNOR TO THOMAS E. MURRAY, OF NEW YORK, N. Y.

ELECTRIC WELDING-MACHINE.

1,212,869.     Specification of Letters Patent.     Patented Jan. 16, 1917.

Application filed October 23, 1916. Serial No. 127,096.

*To all whom it may concern:*

Be it known that I, HARRY R. WOODROW, a citizen of the United States, residing at New York, in the county of New York and State of New York, have invented a certain new and useful Improvement in Electric Welding-Machines, of which the following is a specification.

The invention is an electric seam-welding machine, wherein the welded joint is formed progressively. Because of the variable voltage condition of the supply current, as well as the changeable state of the metal surfaces to be welded, it has hitherto been found necessary to station at each welding machine of this type, an operator who manually controls the feed or the impedance of the welding circuit, in accordance with his personal observation and judgment.

My present invention eliminates the operator, and automatically controls the rate of feed travel of the work, in direct proportion to the amount of energy flowing to the welded joint. That is to say, if the energy input becomes reduced, the speed of travel of the work is proportionately reduced, and if the energy input becomes increased, the speed of travel of the work is proportionately increased. In this way, the amount of energy used to weld the seam per unit length thereof is automatically kept constant, and a perfect and uniform weld results.

The accompanying drawing illustrates partly in electrical diagram my invention applied to a pipe or tube welding machine of known construction, of which machine only so much of the structure is shown as will suffice to show the connection of the invention therewith.

A is a direct current motor to be connected to any suitable source of supply, and rotating by its shaft and gearing 1 the driving shaft 2 of the welding machine. 3 and 4 are disk or roller electrodes, which bear against the tube 5 on opposite sides of the longitudinal seam therein to be closed by welding.

6 is the driving shaft of the machine. On said shaft are worm pinions 8, 9, which engage with pinions 10, 11 on vertical shafts 12, 13 which rotate, by gears 14, 15, parallel vertical shafts 16, 17. The pair of shafts 12, 16 carry grooved rolls 18 which bear against opposite sides of the tube 5. The pair of shafts 13, 17 carry grooved rolls 19 which also bear against opposite sides of said tube. The rolls 18, 19 move the tube longitudinally and progressively onward, as indicated by the arrows *a*.

Above the tube 5 is an inverted yoke 20, in the arms of which are journaled the supporting shafts 21, 22 of the roller electrodes 3, 4. A third worm pinion 23 on shaft 6 engages with a pinion 24 on shaft 25, which shaft is belted to the electrode shafts 21, 22. Immediately below the electrodes 3, 4 is a supporting roll 26 for the tube. The electrodes being driven, also operate to feed the tube.

The source of supply of the welding current is an alternating current generator B, having its terminals connected to the primary of a transformer C. The yoke 20 forms part of the secondary circuit of said transformer, said circuit including the electrodes 3 and 4.

I will now describe my apparatus as here shown coöperating in and with the above set forth machine.

W is a standard wattmeter, of which D and E are respectively the current and potential coils, connected to the generator B. On the wattmeter shaft is a bevel pinion F which engages with a bevel pinion G on shaft H, which shaft carries the pinion I, which is one of the two opposing pinions of a differential gear. The opposite pinion J of said differential gear is carried by shaft K, which is belted to electrode shaft 22. The connection pinions L of said differential gear are on a shaft M, which carries a contact N coöperating with a fixed contact O.

The movable contact N is connected to one of the terminals of the D. C. motor A. The fixed contact O is connected to the shunt field P, and so to the other terminal of said motor. Across the connections from N and O is a resistance Q. As the speed of the motor A, and hence the speed of feed travel of the tube to the electrodes is controlled by the field resistance of said motor, it will be obvious that said speed may be controlled by varying said resistance by short-circuiting resistance Q, which is done by making or breaking circuit at the switch formed by the contacts N, O.

The wattmeter W is driven by the alternating current or energy input into the weld, and as that input varies, so the speed of the wattmeter, and hence the speed of the differential pinion I, which said wattmeter drives, will vary. On the other hand, the speed of the opposite differential pinion J will vary with the speed of travel of the tube through the machine—or, in other words, with the speed of the D. C. driving motor A, and this, as I have said, depends on the field resistance of that motor.

Obviously, if the welding machine (so to speak) drives the differential gear J at the same speed as the wattmeter drives the differential gear I, then the connection pinions L will not rotate, and the switch contact N will not be moved; but if the speed of differential gear I be lower than that of gear J, due to a reduction of the energy input, then the superior speed of differential gear J will cause the contact N to move to and touch contact O, thereby short-circuiting resistance Q. This reduces the speed of said motor, until the two differential pinions I, J once more run at the same speed.

The resistance Q is to be of such value as that with a given tube to be welded, the contacts N, O will intermittently make and break circuit, so that although the speed of the motor A fluctuates, its average speed will be directly proportional to the alternating current input into the machine.

The result is a tube, whereof the seam is welded with the same amount of energy per unit length. I find by actual test of the completed working apparatus, that it produces a perfect and uniform weld regardless of voltage fluctuations on either the A. C. or D. C. supply lines, or the surface condition of the metal at the joint, and accomplishes this automatically and without the need of any personal supervision or manual control by an operator.

Although I have here illustrated my invention as applied to the welding together of the longitudinal edges of a seam in a tube, I do not limit said invention to this particular application, since it may obviously be applied to the welding of any two weldable metal objects.

I claim:

1. An electric welding machine, comprising means for progressively forming a welded joint, and means for automatically controlling the speed of progression of said joint proportionately to the amount of current energy delivered to said joint.

2. An electric seam-welding machine, comprising a direct current motor, rotary electrodes, means actuated by said motor for progressively feeding said seam to said electrodes, an alternating current generator supplying welding current to said electrodes, a differential gear, means for transmitting motion from said feeding means to one of the opposing pinions of said differential gear, a wattmeter in circuit with said generator, means for transmitting motion from said wattmeter to the opposite pinion of said differential gear, and means controlled by the connection pinions of said differential gear for varying the speed of said direct current motor.

3. An electric seam-welding machine, comprising a direct current motor, rotary electrodes, means actuated by said motor for progressively feeding said seam to said electrodes, an alternating current generator supplying welding current to said electrodes, a differential gear, means for transmitting motion from said feeding means to one of the opposing pinions of said differential gear, a wattmeter in circuit with said generator, means for transmitting motion from said wattmeter to the opposite pinion of said differential gear, a resistance, a switch actuated by the connection pinions of said differential gear, and a resistance across the terminals of said switch.

4. An electric seam-welding machine, comprising a direct current motor, rotary electrodes, means actuated by said motor for progressively feeding said seam to said electrodes and for rotating said electrodes, an alternating current generator for supplying welding current to said electrodes, a differential gear, means for transmitting motion from one of said rotary electrodes to one of the opposing pinions of said differential gear, a wattmeter in circuit with said generator, means for transmitting motion from said wattmeter to the opposite pinion of said differential gear, and means controlled by the connection pinions of said differential gear for varying the speed of said direct current motor.

5. An electric tube-welding machine, comprising welding electrodes, means for progressively and longitudinally feeding to said electrodes a tube to be seam-welded, and means for automatically controlling the speed of said tube proportionately to the amount of current energy delivered at the welded joint.

In testimony whereof I have affixed my signature in presence of two witnesses.

HARRY R. WOODROW.

Witnesses:
  GERTRUDE T. PORTER,
  MAY T. MCGARRY.